United States Patent [19]

Bell

[11] 4,190,830

[45] Feb. 26, 1980

[54] LAMP OUTAGE INDICATOR CIRCUIT

[75] Inventor: Robert E. Bell, Harper Woods, Mich.

[73] Assignee: Essex Group, Inc., Fort Wayne, Ind.

[21] Appl. No.: 950,935

[22] Filed: Oct. 12, 1978

Related U.S. Application Data

[62] Division of Ser. No. 779,662, Mar. 21, 1977, abandoned.

[51] Int. Cl.$^2$ .............................................. G08B 21/00
[52] U.S. Cl. .............................. 340/642; 307/10 LS; 315/82; 315/135
[58] Field of Search ............... 340/641, 642, 79; 315/82, 83, 135, 77; 323/75 E; 324/96, 133, DIG. 1; 307/117, 118, 116, 310, 311, 362, 10 LS

[56] References Cited

U.S. PATENT DOCUMENTS

| | | | |
|---|---|---|---|
| 2,071,911 | 3/1937 | Young | 340/642 |
| 2,165,569 | 7/1939 | Obermaier | 340/623 |
| 3,391,302 | 7/1968 | Weingarden | 315/83 |
| 3,443,215 | 5/1969 | Bradley | 324/DIG. 1 |
| 3,660,813 | 5/1972 | Rumpf | 340/642 |
| 3,774,188 | 11/1973 | Bial et al. | 340/642 X |
| 4,087,696 | 5/1978 | Bull | 307/10 LS |
| 4,091,292 | 5/1978 | Sibley | 324/133 X |

OTHER PUBLICATIONS

I.B.M. Tech. Discl. Bull., vol. 14, No. 5; Resistance Testor by A. Yanischeff, Oct. 1971, p. 1368.

*Primary Examiner*—John W. Caldwell, Sr.
*Assistant Examiner*—Daniel Myer
*Attorney, Agent, or Firm*—Lawrence E. Freiburger; Robert D. Sommer

[57] ABSTRACT

An indicator circuit for indicating whether an incandescent type lamp is burned out. The indicator circuits include a voltage reference source and an indicator LED which is normally biased just below the knee of its conduction curve, but which is biased into conduction whenever the monitored lamp burns out. A bridge circuit is utilized so that relatively small variations in power source voltage do not affect the operating point of the circuit.

4 Claims, 8 Drawing Figures

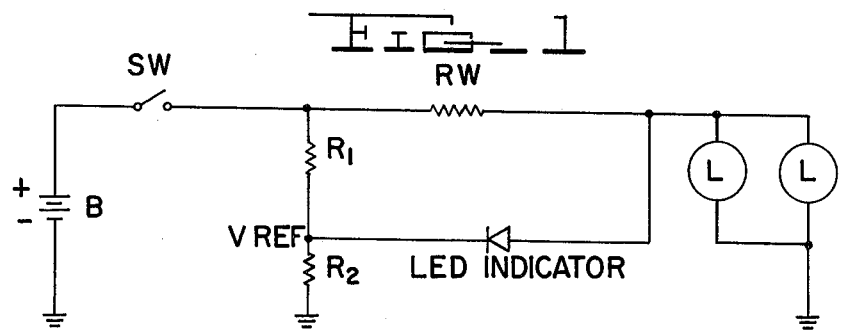
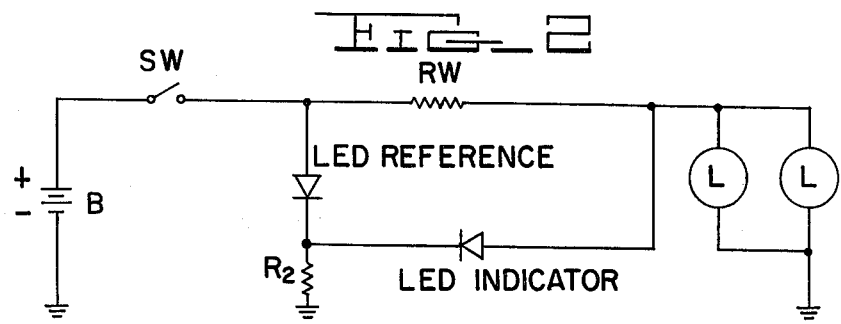
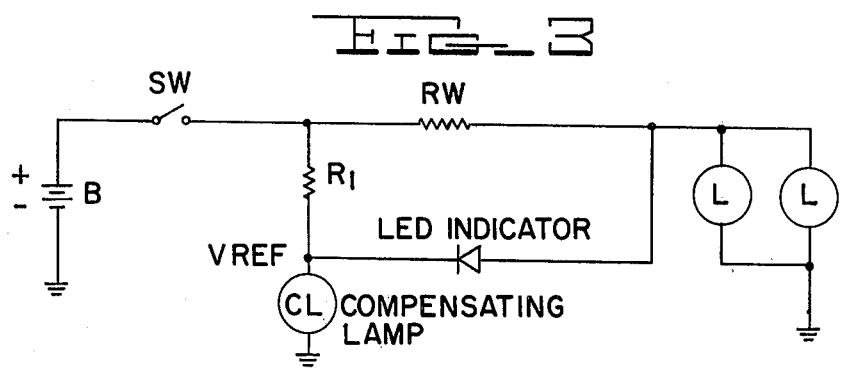
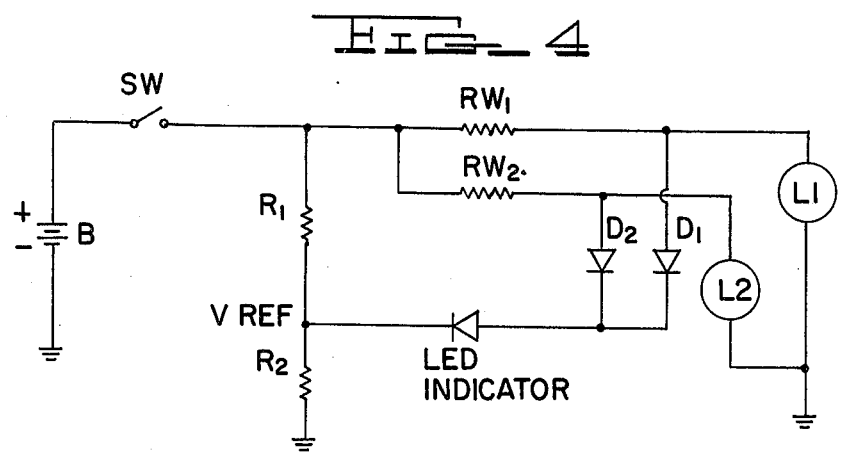

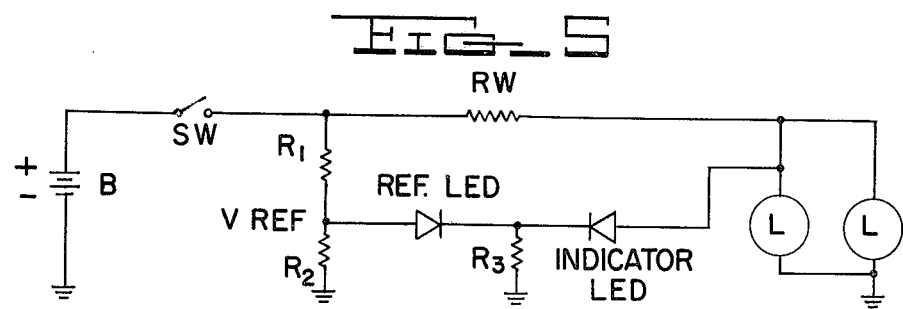
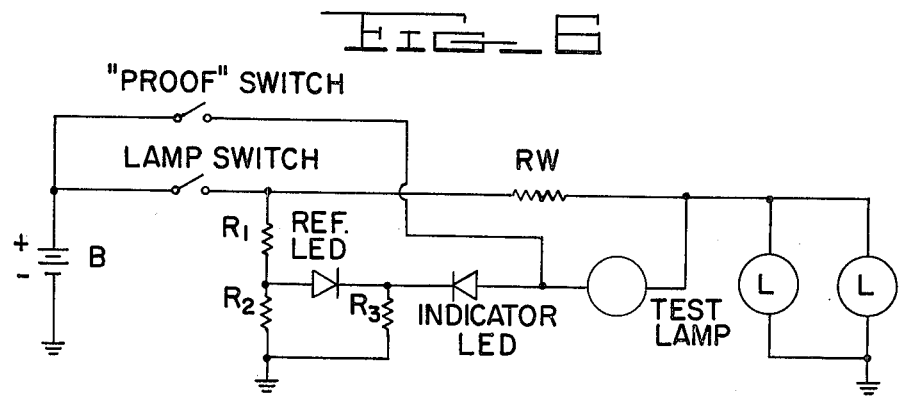
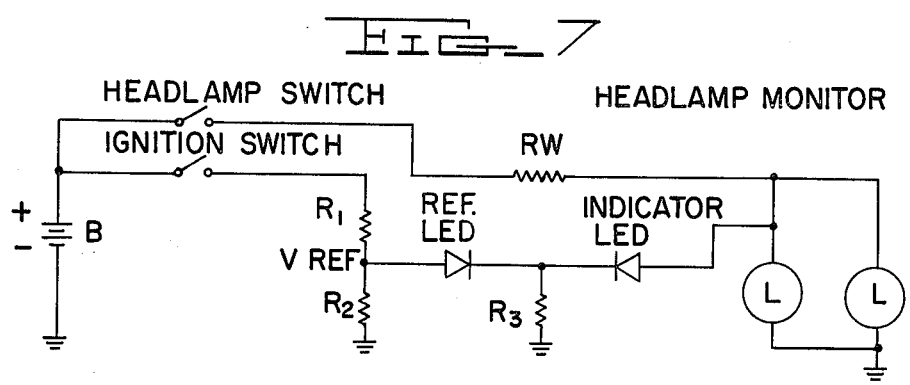
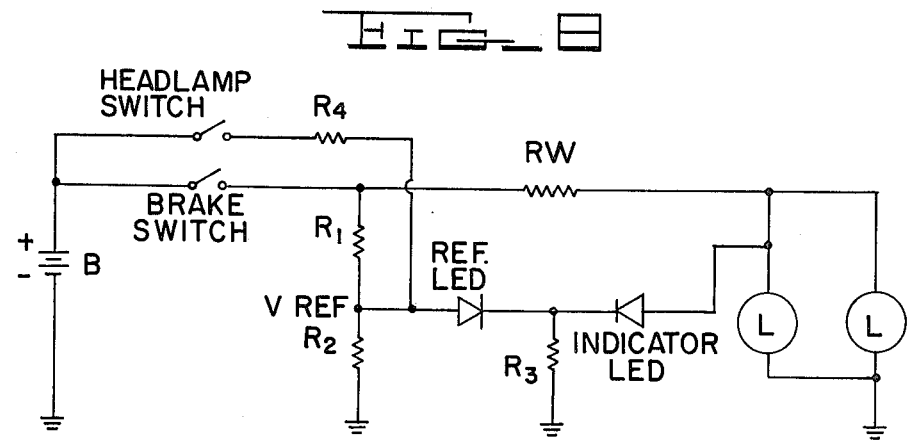

LAMP OUTAGE INDICATOR CIRCUIT

This is a division of abandoned application Ser. No. 779,662, filed Mar. 21, 1977.

BACKGROUND OF THE INVENTION

In many instances, such as in automobiles, it is desirable to provide some means to indicate when a remotely located light bulb has burned out. The prior art lamp outage indicators have taken many forms such as a photoelectric type, a fiber optic type, or a current relay type which senses lamp current. All of these types of lamp outage indicators have proved to be unsatisfactory for one reason or another.

One lamp outage indicator which has proved to be satisfactory in many respects is the one disclosed in McNamee, U.S. Pat. No. 3,735,378. Because of supply voltage fluctuations, the system "balances" a right hand array of lamps against a left hand array of lamps and uses a differential amplifier to detect voltage differences across a pair of sensing resistors to provide the lamp outage indication. It is taught in this patent that the sensing resistors may be the resistance of the wiring harness connecting the power source to the lamp array. While this lamp outage indicator operates satisfactorily for its intended purpose, it suffers from the drawback that an even number of arrays must be monitored to provide the voltage independence.

It is also well known in the prior art, as shown by Craford et al, U.S. Pat. No. 3,964,039, to provide a voltage indicator circuit which indicates a voltage below a first level with a first color LED and indicates a voltage above the first level with a different color LED. The switching point between these two LED's is controlled by a switching transistor.

SUMMARY OF THE INVENTION

It is thus an object of the present invention to provide a lamp outage indicator for single lamps, or arrays thereof, which is particularly useful in an automobile or other vehicle.

It is a further object of the present invention to provide a lamp outage indicator which is relatively insensitive to supply voltage fluctuations.

It is still yet another object of the present invention to provide a lamp outage indicator which includes an indication that the circuit is operative in addition to the lamp outage indication.

The basic lamp outage indicator of the invention essentially includes a voltage divider network connected across a power source to provide a first reference voltage and a relatively small resistance and a lamp (or lamp array) connected in series with the power source. An LED has one terminal connected to the reference voltage point, its second terminal connected intermediate the relatively small resistance and the lamp. The reference voltage point is adjusted so that the LED is forward biased and that the voltage across it is below its "turn on" threshold when the lamp is not burned out. If the lamp burns out, the voltage across the LED is increased to turn it on.

BRIEF DESCRIPTION OF THE DRAWINGS

During the course of the description of the preferred embodiment of the invention, reference will be made to the drawings in which:

FIG. 1 is a schematic diagram of a basic lamp outage circuit in accordance with the present invention;

FIG. 2 schematically depicts an alternate lamp outage circuit in accordance with the present invention; and FIGS. 3-8 depict further modifications and alterations of the basic lamp outage circuit.

DETAILED DESCRIPTION OF THE INVENTION

Referring now to FIG. 1, where the basic lamp outage indicator circuit is shown in combination with a conventional lamp circuit for an automobile such as one side of the tail lamp system. The conventional components are connected in series and include the vehicle battery B, a single-pole single-throw switch SW, the electrical resistance of the wiring harness connecting the switch and the light bulbs $R_W$, and the two light bulbs L connected in parallel. The basic indicator circuit of the invention includes only three components and requires only three wiring connections. The indicator circuit of the invention includes a voltage divider network comprised of resistors R1 and R2 connected at one end between the switch SW and resistor RW and at its other end to ground. A light emitting diode LED has its anode connected intermediate resistance RW and the lamps L and its cathode connected between R1 and R2.

In operation, the circuit of FIG. 1 operates in a conventional manner to turn on the lamps L. The voltage divider determines the voltage VREF at the cathode of the LED and the resistance RW and the lamps L essentially form a voltage divider which determines the voltages at the anode of the LED. Under normal conditions, $V_{REF}$ is adjusted by varying the ratio of R1 to R2 so that the voltage across the LED is just below its "turn on" threshold. If either (or both) lamps L burn out, the forward voltage across the LED is increased to above the "turn on" threshold level so that it emits a visual signal that one (or both) lamps L have burned out.

While the circuit of FIG. 1 is essentially a balanced bridge circuit, it is somewhat sensitive to supply voltage because the LED INDICATOR has a relatively fixed voltage drop characteristic which does not vary with supply voltage. A solution to this problem is to replace resistor R1, with a reference LED as shown in FIG. 2. The resistor R2 is chosen to maintain conductivity of the REFERENCE LED at a point near the knee of its voltage/current curve. This essentially balances the reference LED against the indicator LED so that only the change in current through resistance Rw will change the voltage across the indicator LED. The arrangement of FIG. 2 additionally provides temperature compensation since the two LED's can be placed in the same thermal environment.

It is well known that incandescent lamps exhibit relatively large changes in resistance as applied voltage changes. Thus, if a lamp outage warning circuit is desired to be used in combination with a voltage source which is poorly regulated, the LED monitoring circuits previously described could be too sensitive to voltage fluctuations. In such cases, the circuit of FIG. 3 can be utilized because the affects caused by voltage fluctuations are compensated for by a compensating lamp CL. As in the previous circuits, a voltage divider is utilized to provide a reference voltage, VREF, however, in the circuit of FIG. 3 the voltage divider is comprised of resistor $R_1$ and an incandescent compensating lamp CL. It will be seen therefore that the voltage VREF varies with fluctuations in the applied voltage provided by battery B and has the tendency to compensate for changes in resistance by lamps L with changes in applied voltage.

If a stable switching point is desired, many additional semiconductor components may be utilized to provide a stable switching point. This type of lamp outage indicating circuit is depicted in FIG. 4 where a pair of incandescent lamps L1 and L2 are connected to a power source B, a switch SW, and a pair of relatively small resistances RW1 and RW2. The resistances RW1 and RW2 are small enough in magnitude that they can be a wire of sufficient length such as the wire connecting the light switch and the parking lights in an automobile. As discussed in connection with all the above described lamp outage indicating circuits, a voltage divider comprised of resistors R1 and R2 provides a reference voltage at point VREF. A first diode D1 has its anode connected intermediate RW1 and L1 such that the conductive state of L1 essentially determines the voltage at the anode of D1. In the same manner, diode D2 has its anode connected intermediate RW2 and L2 so that the conductive state of L2 essentially determines the voltage on the anode of D2. Preferably, diodes D1 and D2 are Schottky diodes having a low millivolt drop and a stable threshold. The cathodes of D1 and D2 are electrically connected together and are connected to the anode of an LED INDICATOR, the cathode of which is connected to point VREF. In operation of the circuit of FIG. 4, resistors $R_1$ and $R_2$ are adjusted as in the previous circuits so that the LED INDICATOR is off and the voltage across diodes D1 and D2 is below their threshold value whenever lamps L1 and L2 are lit. However, when either of lamps L1 and L2 burns out, the increase in voltage at the anode of its respective diode (D1 or D2) biases it into conduction and turns on the LED INDICATOR. Thus, with the arrangement shown in FIG. 4, lamps L1 and L2 are essentially monitored separately.

Still another embodiment of the present invention is disclosed in FIG. 5. In this circuit, the voltage on the anode of the REFERENCE LED indicated by the label VREF is essentially controlled by the voltage divider consisting of resistors R1 and R2. The anode of the INDICATOR LED is connected intermediate the conductor resistance RW and the monitored lamps L so that its voltage level with respect to ground increases when one, or both, of lamps L burns out. The cathodes of the REFERENCE LED and the INDICATOR LED are electrically connected to a common point as is resistor R3 which has its other terminal connected to ground. In operation of the embodiment disclosed in FIG. 5, the voltage divider is adjusted so that REF LED is biased into its conductive state and R3 is chosen so that the INDICATOR LED is biased just below the knee of its conduction curve (off), when both lamps are on. Since the purpose of R3 is to limit the INDICATOR LED current to a safe level in the unlikely event that both lamps L should burn out at the same time, R3 should be chosen to be of sufficiently large magnitude to provide this limiting function. It has been found that R2 should then be chosen to be about 1/5 of R3 in order to stabilize the operating point of the INDICATOR LED. When the circuit is properly adjusted, it will be seen that the voltage at the junction of the cathodes of the LED's will be accurately determined by the REFERENCE LED. When one (or both) of the lamps L burn out, the voltage level on the anode of the INDICATOR LED will increase enough to bias it to an operating point above the knee of its characteristic curve so that it emits light to indicate that one (or both) of the lamps L are burned out.

FIG. 6 depicts a similar circuit to FIG. 5 but with the addition of a proof circuit to test the condition of the circuit. It will be noted that in FIG. 6 a TEST LAMP has been added between the anode of the indicator LED and the non-grounded side of the lamp array consisting of lamp L. Additionally, a normally open PROOF SWITCH has been added between the positive battery terminal and the anode of the INDICATOR LED. The TEST LAMP is a low wattage lamp so as to prevent high currents from turning on the monitored lamps whenever voltage is applied through the PROOF SWITCH. In operation, circuit of FIG. 6 operates in a similar manner to that of FIG. 5. Since the TEST LAMP is a low wattage lamp, its resistance in the monitoring condition is as low as 3 or 4 ohms so that it does not substantially affect the operation of the circuit. Whenever the PROOF SWITCH is closed the anode of the INDICATOR LED will be brought to the 12 volt level to turn it on, thus indicating that the circuit is operative. The TEST LAMP is additionally turned on and since its resistance in the on state is 50 ohms or so, it effectively isolates the monitored lamps. It should be noted that an isolating resistor cannot be used in place of the test lamp because its resistance would be too great and would desensitize the LED warning circuit under monitoring conditions.

The circuit of FIG. 7 is similar to that of FIG. 5, but in addition, provides a visual warning that the monitored lamps are still burning after a main control switch has been opened. For example, the monitored lamps could be vehicle headlamps and the main control switch could be the ignition switch. Specifically, FIG. 7 differs from FIG. 5 in that a HEADLAMP SWITCH controls current flow to the monitored lamps L and the IGNITION SWITCH controls current flow to the voltage divider and REF. LED. With such a circuit arrangement, it will be appreciated that whenever both switches are closed, the circuit will operate in much the same manner as FIG. 5, that is, whenever one, or both, of the monitored lamps burns out, the INDICATOR LED will be biased so that it emits light. However, if the IGNITION SWITCH is opened and the HEADLAMP SWITCh closed, the INDICATOR LED will emit light to signal the driver that the headlamps are on. If the HEADLAMP SWITCH is open and the IGNITION SWITCH closed, it will be seen that monitored lamps L and INDICATOR LED will remain off.

It is contemplated that the lamp failure indicator of the invention can be used to monitor the condition of any incandescent lamp in an automobile. However, since the cost of providing each such lamp with an outage indicator would be prohibitive, it will be appreciated that only such lamps as the headlamps, brake lights, tail lights, and turn signals which are necessary for the safe operation of the vehicle will be monitored. The circuits thus far described utilize an LED as a voltage sensitive device and an indicating device. Further, since the brightness of the LED's light emission varies with applied voltage it is necessary to provide bias conditions which are sufficient to allow the indicator to be seen when a monitored lamp burns out. There is generally no problem with biasing for a lamp outage indicator for headlamps and tail lights since these lamps are normally operated only at night. However, the brake lights present a problem since they are operated at any time of day. Thus, it is desirable to provide a lamp outage indicator for brake lights in which the indicator is much brighter during the day than at night. The circuit of FIG. 8 provides for such brightness control of the outage indicator device. The circuit of FIG. 8 is essentially the same as FIG. 5 except that the reference voltage VREF is varied depending upon whether it is night or day. In the circuit of FIG. 8, the HEADLAMP SWITCH and a resistor R4 in series therewith are connected to the point VREF. Thus, it will be appreciated that whenever the HEADLAMP SWITCH is closed (normally at night), bias voltage on the REF. LED will be altered so that the INDICATOR LED will not provide as bright an indication as when the HEADLAMP SWITCH is opened.

Other modifications will occur to those skilled in the art. For example, a transistor may be utilized in conjunction with another voltage sensitive semiconductor device to energize a two terminal indicator device to provide the necessary lamp outage indication. It will also be clear that these circuits are easily adapted for use with lamps in which the actuating switch is located in the ground lead. Accordingly, a number of embodiments of the invention have been disclosed in order to illustrate the principles of the invention. It is not intended that the invention be limited to the disclosed embodiments but that it be defined in the claims.

What is claimed is:

1. A lamp outage indicator for an incandescent lighting system having a source of direct current, a first resistance of relatively small value and a first incandescent lamp connected in series across said source, which comprises:
   a voltage divider network comprising a second resistance and a third resistance connected across said source of direct current;
   a first two terminal voltage sensitive indicator device and a fourth resistance connected in series, with the free terminal of the said first voltage sensitive indicator connected intermediate said second and third resistances, and the free terminal of the said fourth resistance connected in common with the incandescent lamp and the source of direct current; and
   a second two terminal voltage sensitive indicator device, the first terminal of said device being connected intermediate said first two terminal voltage indicating device and said fourth resistance, the second terminal of said device being connected intermediate said first resistance and said incandescent lamp.

2. A lamp outage indicator as claimed in claim 1 wherein a second incandescent lamp is interposed in series with said second two terminal voltage sensitive device, and a lead connected intermediate said second two terminal voltage sensitive device and said second incandescent lamp which when returned to said source of direct current causes the said second two terminal voltage sensitive device to be turned on.

3. The lamp outage indicator as claimed in claim 1, further comprising:
   a first electrical switch connected between said source of direct current and said first resistance; and
   a second electrical switch connected between said source of direct current and said voltage divider network.

4. The lamp outage indicator as claimed in claim 1, further comprising:
   a first electrical switch connected between said source of direct current and said first resistance; and
   means for modifying the voltage at the point intermediate said second and third resistances.

* * * * *